United States Patent
Guillama et al.

(10) Patent No.: US 9,532,295 B2
(45) Date of Patent: Dec. 27, 2016

(54) PREDICTIVE PATH COMMUNICATION PROTOCOL ACROSS A NETWORK OF TRANSIENTLY CONNECTED MOBILE DEVICES

(71) Applicant: Synabee, Inc., Wellington, FL (US)

(72) Inventors: Noel J. Guillama, Wellington, FL (US); Jahziel M. Guillama, Wellington, FL (US); Chester Heath, Boca Raton, FL (US)

(73) Assignee: Synabee, Inc., Wellington, FL (US)

( * ) Notice: Subject to any disclaimer, the term of this patent is extended or adjusted under 35 U.S.C. 154(b) by 81 days.

(21) Appl. No.: 14/467,562

(22) Filed: Aug. 25, 2014

(65) Prior Publication Data
US 2015/0055592 A1    Feb. 26, 2015

Related U.S. Application Data

(60) Provisional application No. 61/869,096, filed on Aug. 23, 2013.

(51) Int. Cl.
| | | |
|---|---|---|
| H04W 4/00 | (2009.01) | |
| H04W 40/20 | (2009.01) | |
| H04W 40/24 | (2009.01) | |
| H04W 88/04 | (2009.01) | |

(52) U.S. Cl.
CPC ........... *H04W 40/20* (2013.01); *H04W 40/242* (2013.01); *H04W 88/04* (2013.01)

(58) Field of Classification Search
CPC .... H04W 72/048; H04W 28/08; H04W 40/20; H04W 20/242
USPC ......................................................... 370/329
See application file for complete search history.

(56) References Cited

U.S. PATENT DOCUMENTS

| | | | |
|---|---|---|---|
| 2008/0153509 A1* | 6/2008 | Piekarski | H04W 64/00 455/456.2 |
| 2014/0094180 A1* | 4/2014 | Zhou | H04W 40/30 455/445 |

* cited by examiner

*Primary Examiner* — Sai-Ming Chan
(74) *Attorney, Agent, or Firm* — Nixon Peabody LLP

(57) ABSTRACT

Systems and methods for data transmission via a network comprising a plurality of mobile nodes that connect transiently or intermittently are provided. A method includes receiving information at a location to be transmitted via the network, obtaining position information for the plurality of mobiles nodes as a function of time, determining a strategy for transmitting the message to a destination via the plurality of mobile nodes based on the position information and the location, and transmitting the message via the plurality of mobile nodes based at least on the strategy and an actual availability of the plurality of mobile nodes.

12 Claims, 13 Drawing Sheets

PREDICTIVE PATH COMMUNICATION PROTOCOL ACROSS A NETWORK OF TRANSIENTLY CONNECTED MOBILE DEVICES

CROSS-REFERENCE TO RELATED APPLICATIONS

This application claims priority to and the benefit of U.S. Provisional Application No. 61/869,096, filed Aug. 23, 2013 and entitled "PREDICTIVE PATH COMMUNICATION PROTOCOL ACROSS A NETWORK OF TRANSIENTLY CONNECTED MOBILE DEVICES", the content of which is herein incorporated by reference in its entirety.

FIELD OF THE INVENTION

The present invention relates to communications, and more specifically to apparatus and methods for providing communications in a network including transiently connected mobile nodes.

BACKGROUND

The cost and practicality of communication between two points is often a factor of bandwidth, message size, and distance. Specifically, mobile devices are typically restricted to comparatively short range communications to peer devices (blue tooth, infrared, near field) and bridged through longer distances through WiFi, cellular mobile radio towers and the like. Even at a larger scale, e.g. between ships at sea, the cost of direct microwave peer to peer between ships is radically less expensive than satellite connectivity.

Long distance communication is typically afforded by a bridge to a background media such as wired networks, Internet, microwave, synchronous and asynchronous (low orbit) satellite, even relayed by aircraft that are typically much more costly than the short range connectivity of the mobile device. Further, the information may be intercepted, when broadcast over such long range means by an unintended third party.

Mobile devices are becoming social. In advanced societies, the majority of individuals now carry cellular communication devices, many of which can also communicate with limited range wireless means. If a protocol existed, these devices could pass a message to another device by short range hopping from one nearby device to another. Indeed, a considerable distance could be covered if the protocol allowed the message to spread amongst a crowd of such devices to an unknown, but specific destination well beyond the capability of a single peer to peer connection.

One analogy is the parlor game where a first participant whispers a message into the ear of another, who similarly passes the message to another, and so on down the length of a sofa to a final participant. The message arrives, albeit often humorously distorted, but out of the earshot of a whisper. With modern digital content verification, such as a check code—and—modern data encryption, the message can arrive intact, precise, and unknown to the intervening participants. The humor of the parlor game is lost, but the message arrives.

Now think in terms of an air traveler who whispers in the ear of each person that they meet some parts of a whole message: "My name is Tom Traveler and I'm looking for Joe Smith who is here to pick me up; tell him to meet me at the baggage claim number 26" and that message is passed peer to peer, between all the individuals milling about the busy airport until it eventually arrives at Joe Smith. Discounting the obvious social faux pas of randomly approaching strangers this way, the message does arrive and if it were digital, it would again be intact, precise, and unknown to the intervening participants. And Tom Traveler gets his ride home.

Figure 1:
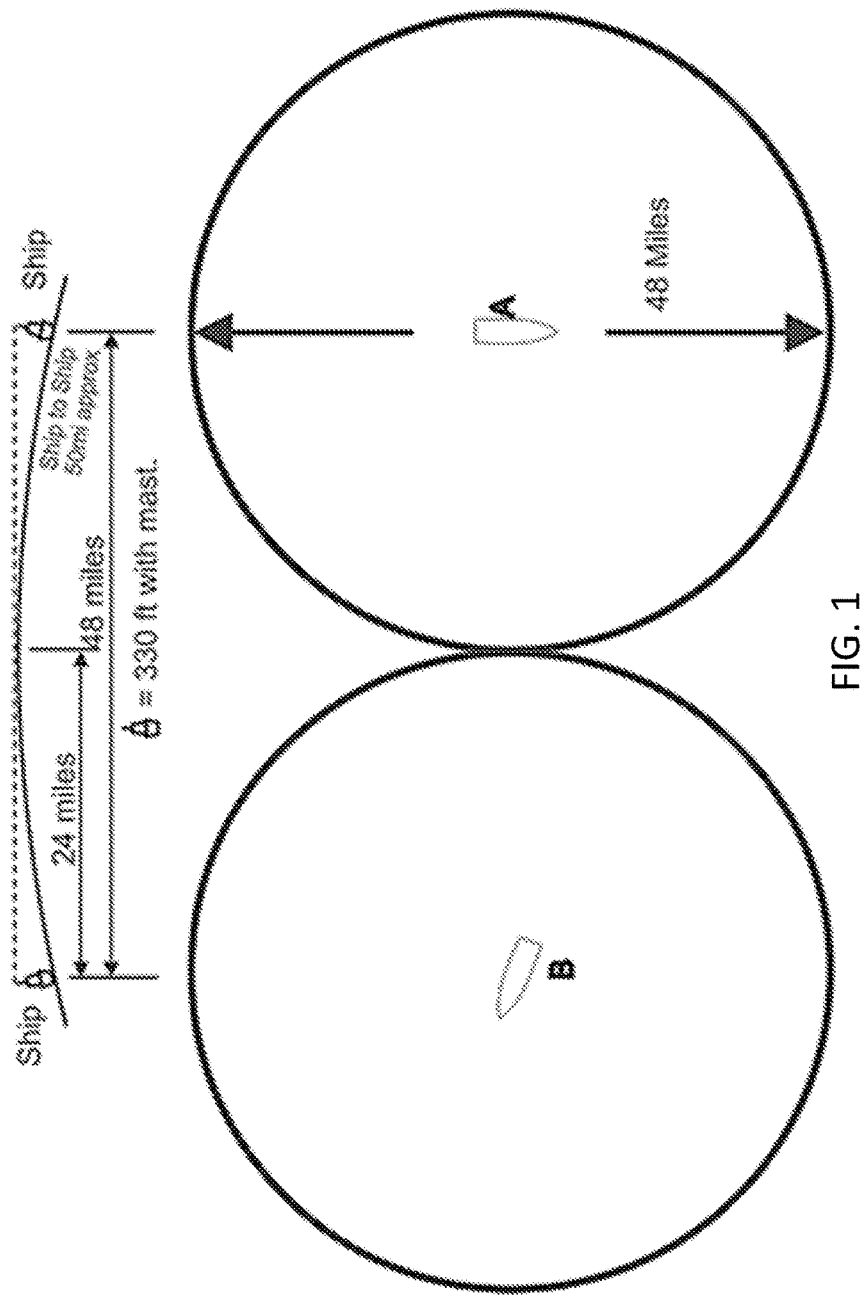
FIG. 1 schematically shows line of sight communications between two point in accordance with the present technology.

Some of the figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk or the like). Similarly, the programs may be standalone programs, may be incorporated as subroutines in an operating system, may be functions in an installed imagining software package, and the like.

It should be understood that the various embodiments are not limited to the arrangements and instrumentality shown in the drawings.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Although the concept of passing messages from node to node is well-known, the technology described in the present disclosure is directed to a configuration that is infinitely more complex than the examples discussed above. In particular, the present disclosure describes a new protocol for data transmission through multiple peer to peer transactions typically cascaded between multiple intermittent or transiently connected devices and assembled as a message at a remote destination or destinations. This new protocol differs from normal internet routing, in that all the nodes are typically not in continuous connection and are in motion. Knowing only the predicted positions of the mobile nodes, the same information about the destination node and potential partners to pass messages through as intervening notes, the present technology describes a strategy to deliver each and every message piece to its intended destination. That is, a Predictive Path Protocol in which by knowing the schedules, courses, paths, probable meeting points, and times when intermittent nodes in a network are capable of communicating with at least one peer member of the network, a path of (sequential, ordered, or random) exchange between intermittently connected nodes in the network can be defined and utilized.

The protocol is designed to allow low cost long distance communication to mobile or stationary components using typically shorter range communication means in a complex "bucket brigade" fashion, i.e., via a series of handoffs. The protocol can apply to mobile personal devices and vehicles, including automobiles, ships, aircraft, and spacecraft, to connect to remote points where bandwidth, distance or range, or exact current or future position is unknown or expensive or impractical to ascertain.

An advantage of the present technology is that it provided secure delivery as when a message cannot be unencrypted in partial completion. That is, a message is only vulnerable to snooping by third parties—and the position of the intended recipient is only known to the master system and only valid at the time of final delivery.

In some embodiments, heuristic learning with a distributed intelligence can be incorporated at the various nodes. That is, each node can have intelligence and maintains awareness of all other nodes in the network—without dependence on a central dispatching system. Thus Status and commands are passed by intermittent connection or use of asynchronous means where appropriate.

The present disclosue contemplates that the present technology includes coordination of multiple cellular and mobile systems in a common protocol—a mix of near field, blue tooth, optical, WiFi, cellular, satellite, point to point wireless, and traditional wired high bandwidth networks.

Choosing an example for illustration, consider the problem of communicating to ships at sea. A conventional, brute force means is to use satellites in synchronous or low orbit to link between all ships, on demand, as required. However, this has two problems: (1) access/use costs are typically high and (2) because everything flows through the satellite, there is typically a limited number of channels and bandwidth available.

While it may be impossible to eliminate all traffic through satellites, reducing satellite traffic can produce significant cost savings. Consider that the ships themselves form a network of intermittently available cells, as illustrated in FIG. 1. Messages or message fragments could be passed, peer to peer, between ships (i.e., between A and B in FIG. 1) whenever the ships are in proximity. The ships can communicate, line of sight, whenever the periphery of the cells touch.

In such cases, the cell size can be quite large. Consider a cruise ship that is 330 feet tall from the waterline to the top of a mast, where an transceiver antenna would be installed. Ignoring atmospheric refraction, distance (d) of the transceiver antenna to the horizon line of sight close to the Earth's surface is approximately given by:

$$d=\sqrt{1.5 \cdot h}, \quad (1)$$

where h is the height above sea level. As an example, equation (1) this gives:

At eye level (5 ft 7 in) (average eye-level height), the horizon is at a distance of 2.9 mi.

At 2 meters (6 ft 7 in), the horizon is at a distance of 3.1 mi.

So, even a tall person, could not "see" another tall person more than 6.2 miles away. However, in the case of an antenna at the top of the mast, equation (1) provides:

For a small boat with 40 ft to the top of its mast, the horizon is at a distance of 7.7 mi.

For a large boat with 330 ft to the top of its mast, such as a cruise ship, the horizon is at a distance of 24 mi.

Thus, as illustrated in FIG. 1, the top of the masts for two similarly outfitted cruise ships can be separated by 48 miles and still be within a line of sight of each other.

Moreover, for the exemplary cruise ship, this also means, that 48 miles is also the cell diameter around a ship. For a land based tower of 1000 ft (assuming no significant geographic features) the line of sight distance is 38 mi and a cell diameter of 76 miles. A drone or piloted aircraft at 25,000 feet can see approximately 200 miles to the horizon and 400 miles to another aircraft at the same height.

As noted above, assuming that a transceiver antenna is mounted at a top of the mast of exemplary cruise ships with a height of 330 ft, ships less than 48 miles apart can be in continuous line of sight and thus maintain radio contact. If cells overlap and assuming microwave transmission at X band (12 GHz) with modulation index of 10 with 8 simultaneous channels, it is possible to achieve a 1.2 GByte/sec data rate among a group of ships. (1200 simultaneous 1 mbit/s channels/ship). Unfortunately, this data rate can only be maintained intermittently and thus is not useful for real-time communications among a group of ships—as illustrated with respect to FIGS. 2A, 2B, and 2C.

Figure 2A:
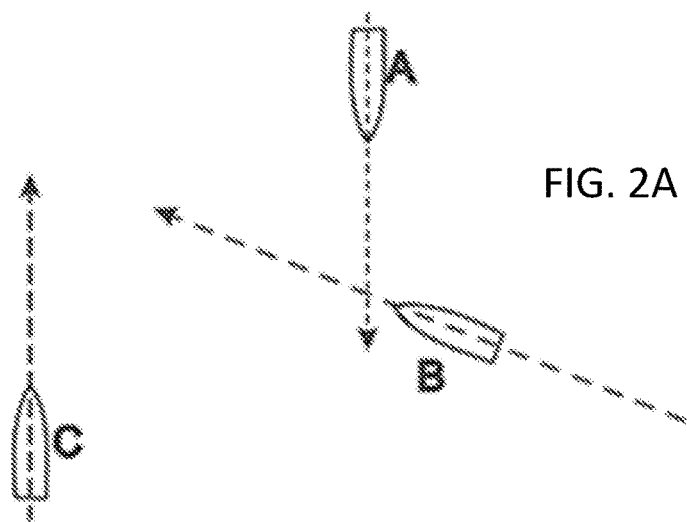
FIGS. 2A-2C schematically illustrate motion and cell overlaps between ships in accordance with the present technology.
Figure 2B:
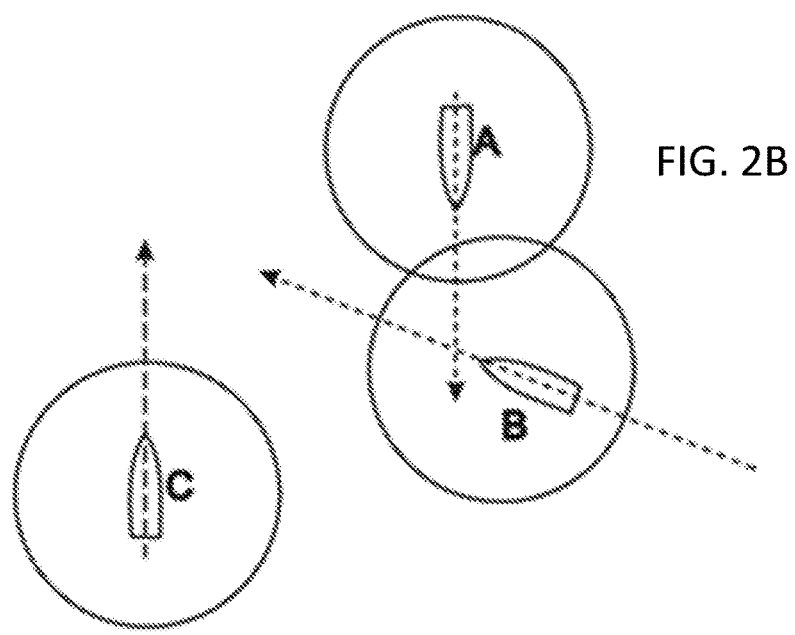
Figure 2C:
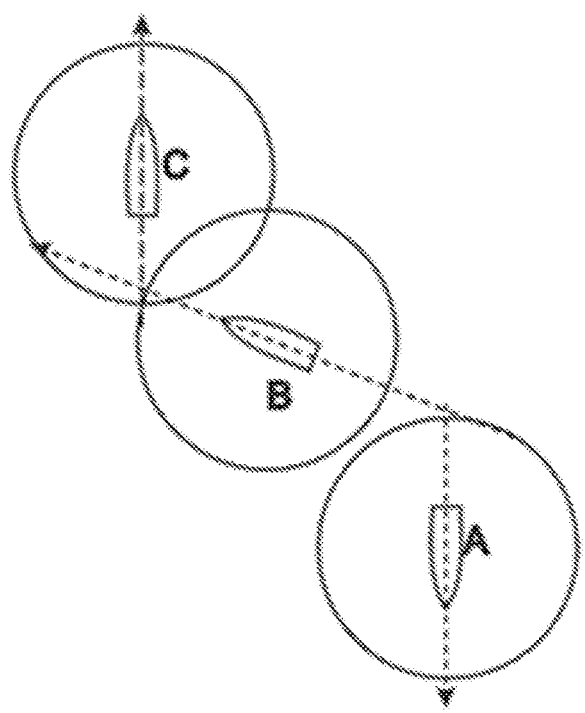

FIG. 2A shows 3 ships: A, B and C, each moving on different courses and at dissimilar speeds. FIG. 2B shows FIG. 2A, with cells for each ship illustrated by circles. Ships A and C on parallel courses cannot communicate directly, as their cells will not overlap. Ships A and B are shown in FIG. 2B with currently overlapping cells, so direct communication is possible. However, this is only temporarily as the cells for ships A and B will eventually stop overlapping due to the motion of ships A and B. Eventually, as ships A, B, and C continue on their respective courses, the cells of at least ships B and C will overlap, as shown in FIG. 2C. However, as with the cells of ships A and B, the cells of ships B and C will also eventually cease to overlap. Thus, as the cells of ships A, B, and C are not in constant communication, the cells provided by each of the ships cannot be utilized to support real-time communications.

However, in an effort to reduce reliance on satellite communications, the technology described in the present disclosure leverages the temporary overlap of cells to support non-real-time or deferrable communications, such as email, text messaging, or any other type of transfers of data not requiring a consistent network connection. This can also be illustrated with respect to FIGS. 2A, 2B, and 2C. As described above, the cells of ships A and B temporarily overlap. Although this means a connection cannot be maintained indefinitely between ships A and B and no connection to ship C is possible during the overlap shown in FIG. 2B, the temporary overlap can be utilized to provide communications from ship A to ship C. That is, data or messages for ship C or another ship, or portions thereof, can be passed from ship A to ship B while their cells overlap and stored in a transponding server at ship B for eventual passing on to ship C or another ship. Later, the stored data can be passed to ship C from ship B while their cells overlap, as shown in FIG. 2C.

The present disclosure contemplates that as more ships are involved, and the longer that their cells overlap, the less intermittent the network connection become and the faster data can traverse the nodes.

Figure 3:
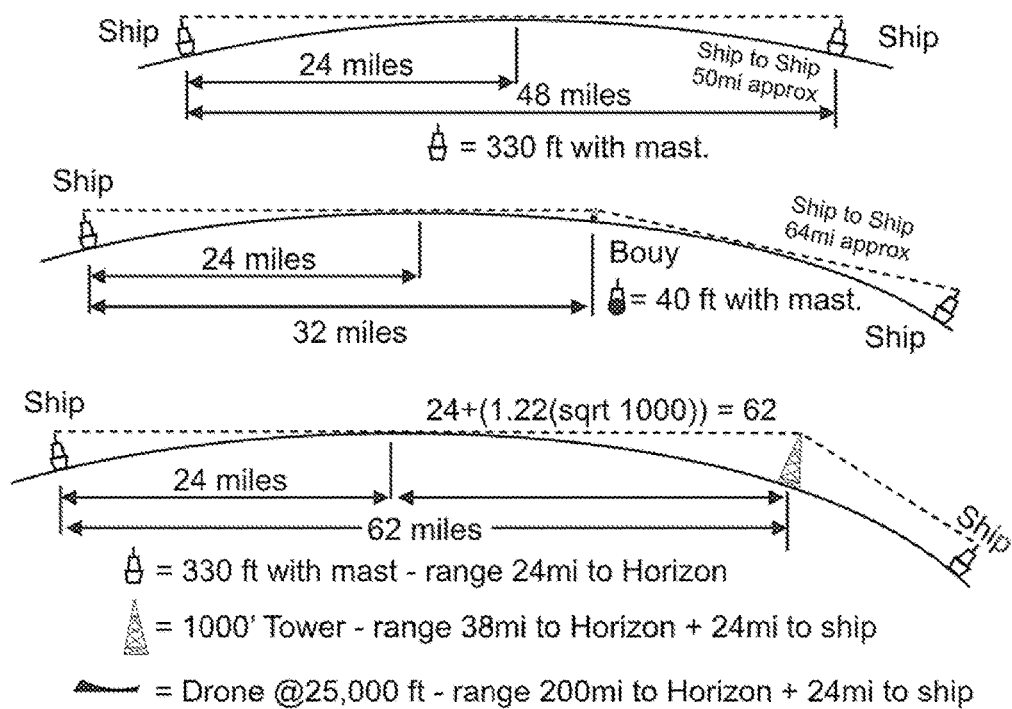
FIG. 3 schematically shows line of sight communications involving repeating points in accordance with the present technology.
Figure 4A:
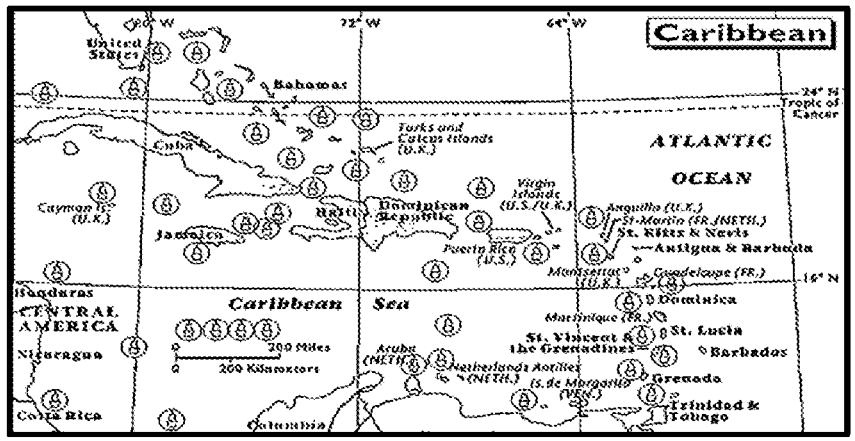
FIGS. 4A-4C schematically illustrate cell coverage in accordance with the present technology.
Figure 4B:
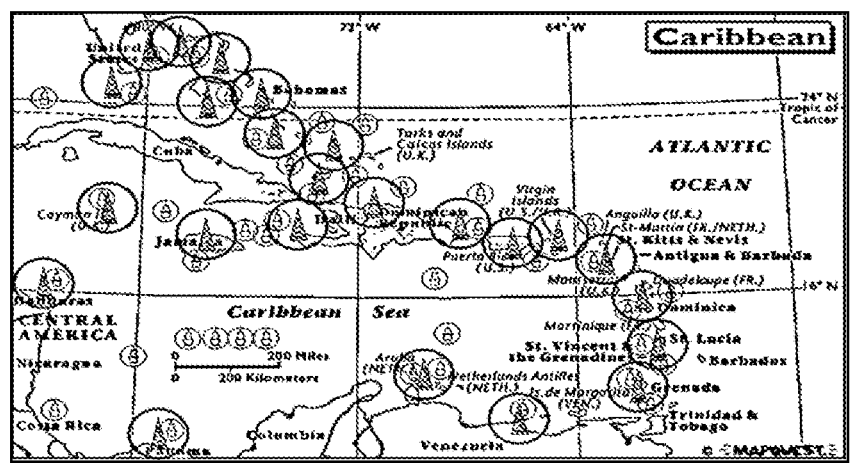

Although the exemplary configuration described above refers to cruise ships, other types of nodes can be provided as well. For example, if land based towers and strategically placed buoys, or drones are added, still better coverage can be attained. This is illustrated in FIG. 3. An exemplary map of nodes or repeaters, with the ships themselves as the primary nodes or repeater sis shown in FIG. 4A. FIG. 4B shows the nodes of FIG. 4A with corresponding cells.

Figure 4C:
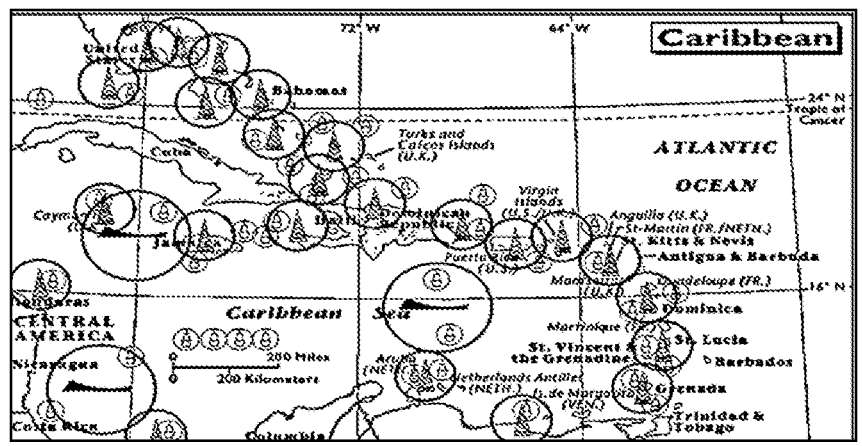
Figure 5A:
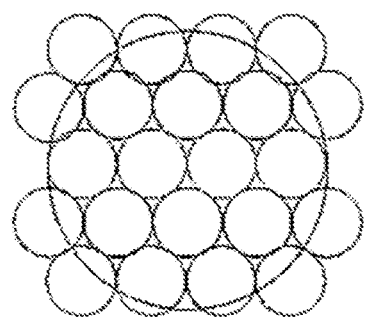
FIGS. 5A and 5B show various configurations for cell overlap coverage in accordance with the present technology.
Figure 5B:
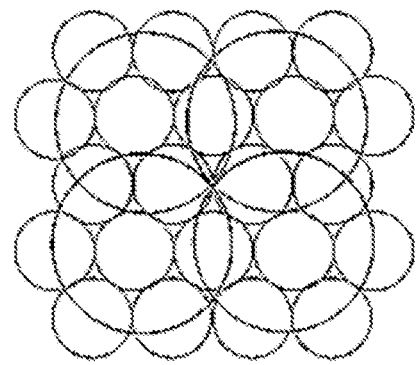

The present disclosure contemplates that even with a significant number of cells, such as shown in FIG. 4B, some significant portion of the time can be required for messages to traverse the complex movement of the cells. However, the present disclosure contemplates that if stationary towers (with greater heights, are added ships will overlap cells with the towers longer and the latency of message transmission can reduced. Thus, in a deployed system, the number and placement of towers can be selected to reduce latency as much as possible. In open ocean areas, satellites and drones or piloted aircraft can be deployed to provide a similar function, as illustrated by the additional cells in FIG. 4C. An idealized graphical comparison shows that a typical aircraft (FIG. 5A) can cover 14 typical cells, while a group of 4 towers (FIG. 5B) might cover as many as 22 cells.

Unfortunately, drones are expensive to maintain, require periodic refueling and therefore standby drones, ground crew, spare parts and maintenance must also be included in their cost analysis. Thus, using aircraft specifically for a communication platform could be pricey and subject to a number of weather related and reliability failures.

However, a transponding server, as a "stowaway" aboard larger and well supported commercial aircraft are regularly scheduled, could be very cost effective, and could serve as an additional revenue stream for the airlines. There would also be many more of them potentially. The size of a transponding server could be less than one half foot—require only 100 watts of power, weigh 10 lbs and cost less than $5000. Further, transponding servers aboard a peaceful commercial aircraft, would be better accepted than the military profile of a drone over nations like Cuba or Nicaragua.

Land based towers (FIG. 5B) are low tech, but largely unaffected by weather and less maintenance than any moving platform. In actuality Land based towers, or any format of flying transponding server platforms would best fill in the mix with what is an ever changing soup of overlapping and isolated shipboard cells with dead spots. In reality, the cells would vary in size with the height of the ships and the altitude of the aircraft. Dedicated drone platforms do have an advantage of essentially stationary positioning; however, with everything else in continuous movement, the coordination of message forwarding may not really be simplified.

Figure 6:
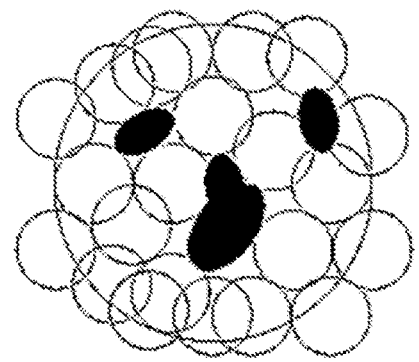
FIG. 6 schematically shows ship-to-ship coverage in accordance with the present technology.

However, if enough aircraft and shipboard cells are defined, and overlap is sufficient, as illustrated in FIG. 6, message forwarding could be essentially continuous, within the darkened regions at least to the degree it is with cellular telephone traffic and isochronous voice communication over such an integrated network is entirely possible. Outside of the darkened regions, intermittent contact would be sufficient for "text" or digital communication with delays. A military version of this means, could also coordinate surface and undersea ships, aircraft, land vehicles and even troops. It could also aid friend-foe identification. Any mix of near field, blue tooth, optical, WiFi, cellular, satellite, point to point wireless, and traditional wired high bandwidth networks is conceivable with intermittent connection between all mobile devices.

One tremendous advantage that makes this system more efficient is that the routes over which the ships repeatedly travel is relatively known. Thus, there is an "initial omnipotence" where the most probable and efficient paths can be predicted. Indeed by modifying the specific routes, ships could be paced for optimal node to node relay, and courses set for maximal cell overlap probability when intermittent paths are established. Packets might just flood the network until all are received at the intended destination, or be sent in some intelligent fashion. Rather than sequentially, packets might be sent at random, or some prioritized for faster delivery, or prepositioned to towers in advance of a given ships overlap to minimize latency.

If commercial aircraft (also with known routes, schedules and positions) carry transponding servers to be included in the network, then messages such as email, or aircraft performance can be easily routed between the aircraft and towers and ships. Coverage could become nearly 100% without any dependence on satellite coverage at all.

However a significant number of packets will land in servers within the network and not be routed to their intended destination. So long as one path is found amongst the intermittently connected nodes, or if necessary routed though more expensive satellite and/or drone paths, the messages can be completed. Storage in the shipboard and stationary tower nodes is simply increased and either an expiration time defined for each packet, or an "all clear" command distributed to the servers with all packets of a given message are received and assembled at their destination.

The present disclosure also contemplates that there are other means that will reduce the number of packets that are sent on wild goose chases and not erroneously passed to specific destinations (wasting server time, throughput and space) by defining an appropriate communications protocol. The protocol can be modified from the bit-torrent packet transmission protocol through networks.

Figure 7:
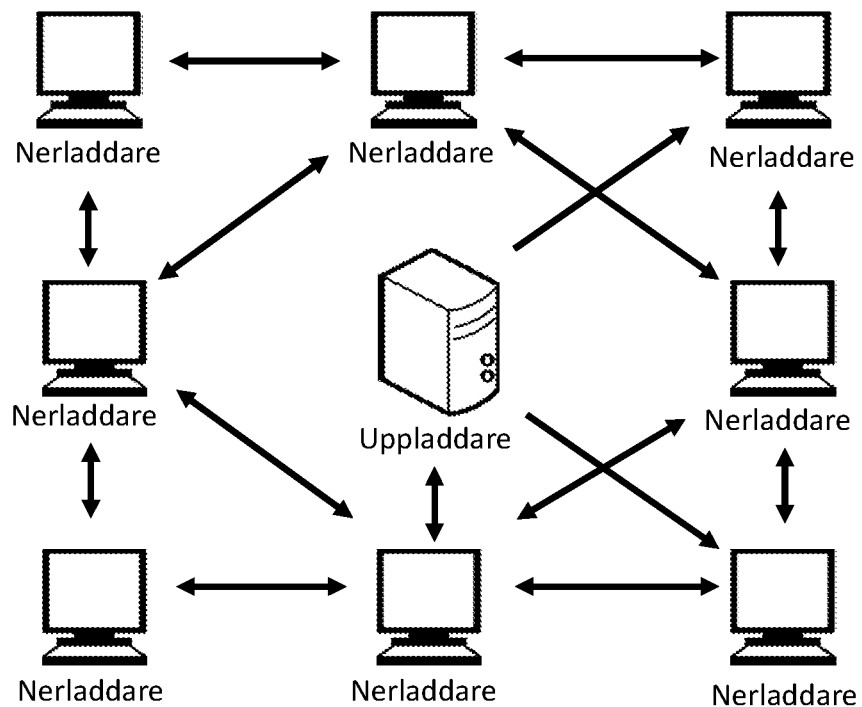
FIGS. 7 and 8 illustrate exemplary torrents-type communications.
Figure 8:
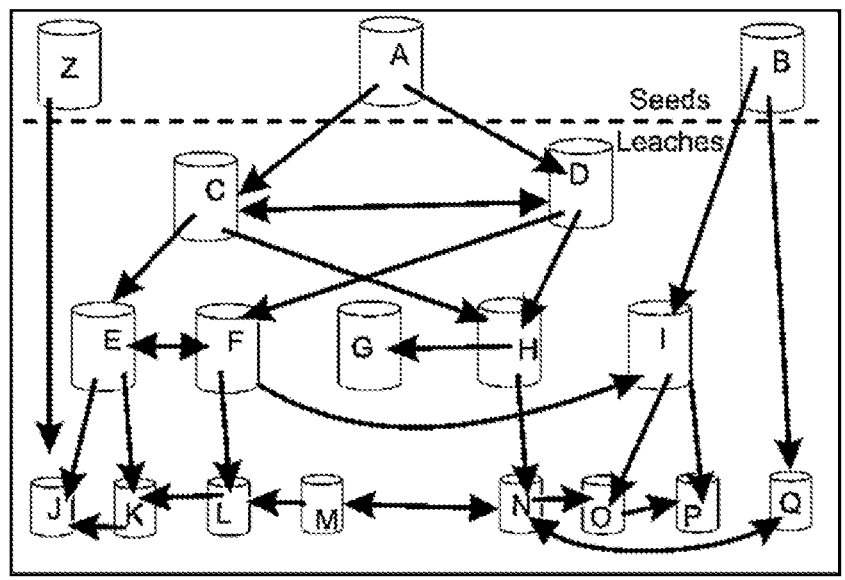

FIGS. 7 and 8 shows an idealized example of bit-torrent: The basic concept is that rather than have a central server be repetitively burdened with dispatching all copies of a file, piece by piece, directly to their destination; each recipient is charged with passing on a copy of that they have received to another node that needs that specific piece. Like some giant card game, where cards are traded to complete a hand, eventually every node receives all the pieces it needs to assemble the entire file. As the labels are in Swedish, "Uppladdare" means a seed server (server in middle of FIG. 7) that contributes all of the pieces of a file (at least once). "Nerladdere" means a "peer" or "leach" that receives the pieces, passes some on to others and eventually assembles a copy of the file. In reality, the exchange is far less orderly than the diagram implies. In actuality it is absolute chaos. A server Z provides a data descriptor to a system requesting a copy of the original file and the descriptor lists the possible nodes that may contain the proper pieces, and this list is updated as the files are assembled by others. This will not work, as is, in an "intermittent" network. For one, there is a single destination that does not know to request a data descriptor—it must be pushed "in kit form" in pieces.

Simply unraveling the chaos of traditional bit torrent requires similar software running in each leaching machine in the network. This program receives the initial data descriptor and periodic information from "trackers" that provide the most up to date information, about who has which missing piece. Note some nodes that have only a small part of the whole can still contribute just as fast as other nodes with more pieces to offer. Indeed, the seeds are often taxed for performance to their maximum capacity to distributing data to other notes that the leach cannot see. The key is that this chaos leads to lower overall dependence on the seed servers and greater interchange between the participating "leaching" nodes. Overall, more data is exchanged and more copies of the file are delivered. Bit Torrent example serves to prepare the reader for a packet oriented protocol that is anything but chaos. Indeed, it depends on many predictible paths for transmission.

The concept of the bit-torrent is turned inside out for the intermittently connected network of the present technology. Rather than a one to many protocol, "Predictive Packet Protocol", is a one to one (through many) concept. The potential intermittent exchange paths are predicted and data descriptors of part or all of a message are pushed to the most likely exchange partners who can preposition pieces, such that the least number of redundant copies are created in order to provide a complete message at the destination. This is a massive compute challenge, even greater than the interpretation of bit-torrent chaos by a receiving system—but well within the capacities of modern data processing.

Figure 9A:
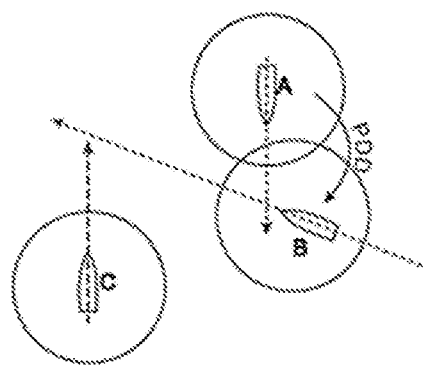
FIGS. 9A-9C illustrate exemplary communications using PPD's in accordance with the present technology.
Figure 9B:
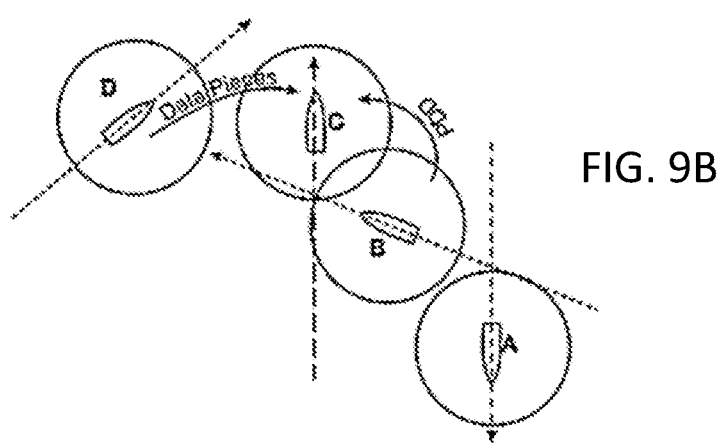

For example, referring to FIG. 9A—if it is known that ship A is likely to intersect ship B, then ship A can be given a "partial data descriptor" (PDD) by which the message destination ship C will know which nodes to request portions of data from—as it later encounters them. Therefore, if ship D has already been delivered a portion of the data associated with the PDD and the destination Ship C encounters ship D, the portion of the data is then requested and delivered to ship C, as illusterated in FIG. 9B. It is the reverse of bit-torrent where there is one recipient, but many "shills" like ship D that are created along its path to provide the remaining pieces of data.

Figure 9C:
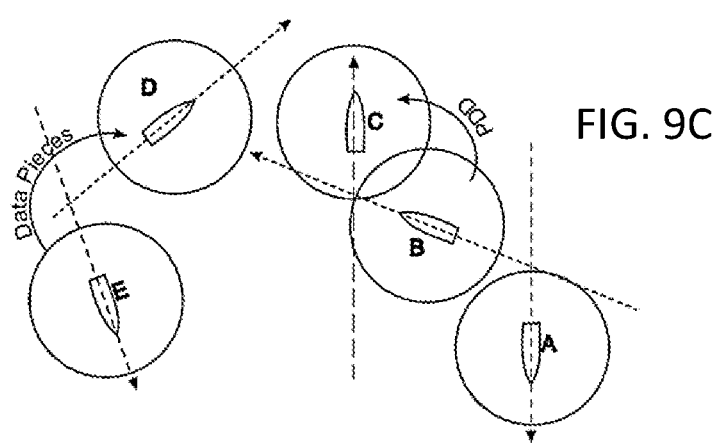

With respect to ship D, ship D acquires the portion of the data it delivers to ship C in a fashion similar to the way ship C has, by obtaining the portion from still another ship in the network (Ship E), as shown in FIG. 9C. Thus, ship E delivers the additional portions required by ship D to build the files for Ship C. Thus, as ships in the network intersect with ship D, ship D accumulates more and more of the portions of data required at the final destination, ship C.

This process, while difficult, can be analogized to "just in time" manufacturing practices. That is, as a developing product goes down a assembly line, the components required to build onto it at each manufacturing station are accumulated just ahead of the time they are needed ("Just In Time") such that the assembly line rolls the embrionic product along without delays and without accumulating excess parts.

From the point of view of Ship C, it is acquiring its message incrementally with each intermittent transaction. This also means that interception of a message by a third party would be extremely unproductive until the complete message was assembled.

Saying it a different way, the PDD is analogous to the build instructions for each assembly point on the production line. Here the destination ship C is the product and the data required to assemble the message is incrementally delivered by "shills" such as D and E just in time for each intersection with its next peer ship. One can imagine a Ship F that has long ago delivered a partial data descriptor to Ship E, who inturn delivered its part of the destination data to ship D.

The present disclosure contempaltes that in the event a ship misses its rendevous, a redundant data payload can be configured to traverse the network of. In some embodiments, if the redundant data payload is not needed, it is simply used to veryify the previous transfer. This is like having more than one delivery of parts to the assembly line. If excess is delivered, in time it will be used. Of course, pieces and transactions are uniquely identified, error checked and encrypted such that only valid messages are securely assembled at the point of destination.

In the present technology, the PDD is a list of commands, per the drawing in the "Architecture" section which follows. The list is like a script of dialogue between different actors in a play. By illustration, below is shown an exemplary list presenting the complete Data Descriptor. A Partial Data Descriptor (PDD) can be any portion thereof.

| | | | | |
|---|---|---|---|---|
| 1—GPS(B) | GPS(A) | REQ/XMIT/ACK | 00:00:00:10 | Packet(O) |
| 2—GPS(C) | GPS(B) | REQ/XMIT/ACK | 00:00:02:34 | Packet(J) |
| 3—GPS(D) | GPS(E) | REQ/XMIT/ACK | 00:00:03:11 | Packet(M) |
| 4—GPS(C) | GPS(D) | REQ/XMIT/ACK | 00:00:04:56 | Packet(L) |
| 5—GPS(F) | GPS(C) | REQ/XMIT/ACK | 00:00:06:30 | Packet(N) |
| 6—TWR(G) | GPS(F) | REQ/XMIT/ACK | 00:00:07:10 | Packet(K) |

The list says that as action 1, at time 00:00:00:10 the node A @ GPS Position A will establish contact with node B @ GPS Position B and transfer "Packet (O)" to node B and obtain an acknowledgement of receipt. Similarly, as a second action: at time 00:00:02:34 "Packet (J)" will be passed by Node B, @ GPS Position B to node C @ GPS position C. Thus at 00:00:06:00, only Packet(O), Packey(J), Packet (M), and Packet (L) will have been collected. Note that the GPS coordinates are that of the nodes at the predicted points in time. IP Addresses are those of the respective nodes and are not included for clarity.

With this Predictive Path Protocol (PPP) of the present technology, there is an analogous role of the tracker. The position, course, speed and potential rendezvous of each ship are known to the cruise lines; the same information is maintained by the FAA with aircraft or other agencies.

In a perfect world, the schedules would be immutable and always accurate. However, in reality, schedules cannot be completely relied upon. Thus, the present technology relies on the use data descriptors to provide known and updated schedule information to the mobile notes. For example, in particular embodiments, a complete Data Descriptor for the "Master Grand Scheme (MGS)" for all mobile nodes in a system could be rigidly defined by an MGS system and distributed once to all participants. However, airplanes and ships and other vehicles sometimes have weather or mechanical problems. Crew and supplies do not always arrive on time; schedules change. Further, for security or reasons no more complex than simplicity, each node only needs to know it's portion of the whole scheme—such that changes only require update to the portions of the grand scheme that effect each node.

For example: while initially the list is correct, one ship gets behind, such that an update MGS is recalculated and a new (one line) PDD for just the line impacted is transmitted to both ships involved in the rendezvous. For example, if ship A meets ship B on time, but encounters rough seas, it will be late for a next encounter with ship C. This information can be transmitted to a central point which then adjusts line 2 for at least ship C from 02:34 to 02:39. This update is then sent to ship C and then used at ship C to determine when ship A can provide the necessary data.

Consequently, as described above, PDDs can be passed along with messaging to update schedules—one line at a time or more as required. PDDs can also be updated by direct communication to each mobile system. Further, each node can adjust timing to some degree allowing for variations in REQ/XMIT/ACK timings. Referring to the example above, this can be done as follows:

1. A 00:00:02:39, both ships transmit a short command to establish contact ("REQ");
2. When packets are exchanged one wayor 2-way "XMIT" (simplex in this example) Packet(J) sent from ship B to ship C; and
3. At the completion of reception, ship C acknowledges receipt with an "ACK".

In certain embodiments, there could be a default MGS stored on all nodes and only the changes to the MGS are relayed to each node using the PDDs. In some cases, the PDDs can be provided on a "need to know" basis. That is, only affected nodes can obtain or are provided the updated information.

If connections are not made in sufficient time—each node can transmit a line of the PDD with the data descriptor labeled as "fail". The MGS system can then recalculate the next possible rendezvous for data exchange, or alternate paths, or directly transmit the information if no alternative means is possible. In some cases, rapid change of a PDD is desirable such that critical rendezvous may be disguised, or only defined to specific node at the last minute for security reasons.

The MGS information can be used to predict the potential data exchange points of various air and sea mobiles, then compile the sequence of exchanges required to have the message traffic available "just in time" for each encounter. And of course, because email, tweet and text message traffic is duplex—both send and receive directions—encounters between the air and sea mobile "vehicles" are exchanges. It is a digital message form of commerce.

That is, the completed message is effectively composed of coordinated subassemblies. As with a car on a production line, the engine, transmission and suspension comprise a major subassembly manufactured on a separate assembly line. It is joined to a body, with instruments, controls and seating as another assembly from a second line; finally the battery, tires, radiator, hoses and wires, windshield and other components are added. The assembly is complete in a finite series of operations and a short amount of time.

This mechanism of the PPP of the present technology vastly reduces the load on a seeding server and the amount of data required to be transiently held in servers. The data that might flood the system otherwise, and tax all the transponding servers along each node is not required. If scheduled commercial aircraft are added to the mix of transponding server nodes, some parts of the whole message can be delivered at the last minute or be used to make up in transfer failures that may occur in the intermediate steps of message assembly. One could expect the ischrony of continuous voice telephony with such coverage.

One advantage of the present technology is that the mobile platforms for the transponding servers already exist in many aircraft and ships already in service. Even when added, the transponding servers for each platform are of relatively low complexity and can be low cost, light weight, and utilize relatively low power. Towers, are a relatively low cost (compared to drones and satellites) new asset that would be added only where necessary to remove "dead spots" in the system. Although less attractive, drones and low orbit/synchronous orbit satellites can be used at to complete the system where other options are not practical. The transponding servers and microwave connectivity could be of very similar design for all there mobile platforms and the essentially identical software development for each node amortized over many units. All in all this should have a higher capacity than satellites or drones, with significantly lower acquisition cost and maintenance.

Figure 10:
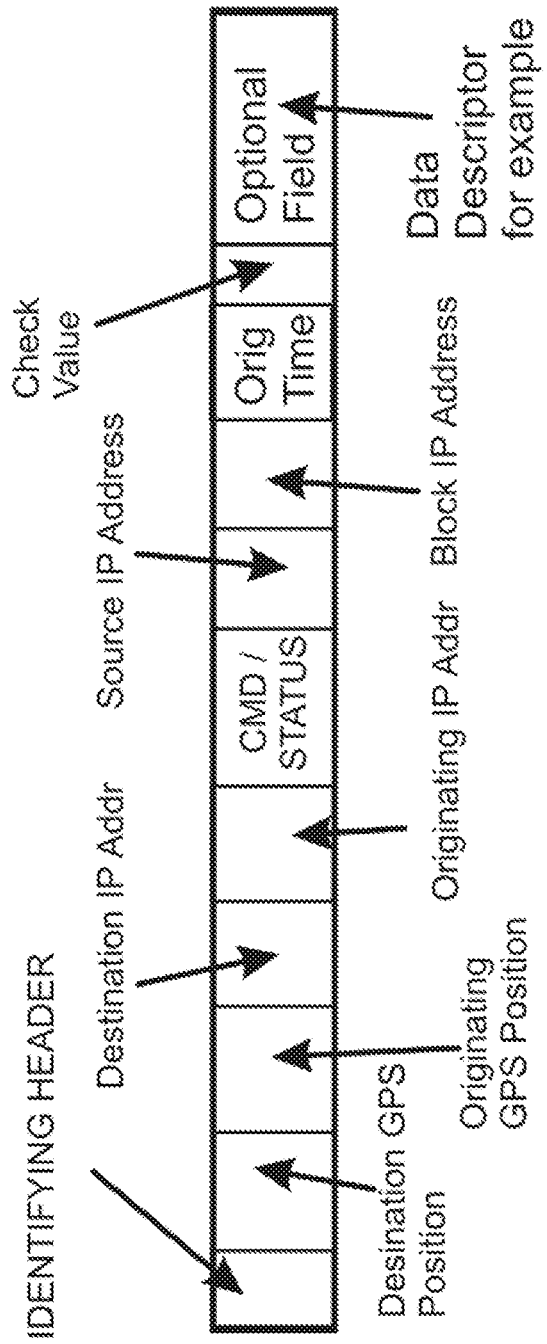
FIG. 10 is an example of a packet in accordance with the present technology.

Architecture for the Predictive Path Protocol. As a means to control, initialize and recover form errors and outages, the PPP provides for a Command/Status Structure. An exemplary configuration of this structure is illustrated in FIG. 10. There can be multiple commands to resynchronize nodes, retrieve status, insert or remove message content, resend, report position, assert the predicted position of the destination system or intervening nodes in the network and the like. A command in this proposed system, can be, for example, 140 bytes, the size of a tweet message and can be delivered to a node by normal network addressing. The field includes an identifying header, that designates the specific node or message sequence number, the network address of sender and recipient, the GPS position of sender and recipient, a binary encoded command field, the origin time, check value, and an extension field to contain a data descriptor or specific message, or other data as defined by the command. Potentially a command may extend to multiple tweets as required. With commands:

Data integrity can be assured with a hash mechanism.
    Data security may be defined with encryption, passwords, path control, etc.
    There is a low bandwidth seek and source request means that spans the tiers of connectivity.
    PPP defines the metadata between source(s) and destination(s)
    PPP can specify specific nodes where data packets can most likely be transferred from one intermittently connected node to another. The nodes along the path could report status as to progress, errors, or a more successful path, such that the system could be heuristic.
    Reverse Path Tracking—Successful transmission paths can be recorded and repeated and saved as preferences for rerouting or resending future messages.
    Packets can be scheduled to arrive just in time for intermittently connected nodes that remain on a schedule, where initially more lead time and redundant paths may be defined for newer, un-established paths.

Some messages may be defined as more important than others—that is: higher priority messages would bump lower priority messages on these nodes, or possibly all nodes.

Some nodes may be permanently or temporarily defined as priority only, or reserved for redundant packets or messages.

Indeed there could be defined an established hierarchy to sets of nodes—where for example—stock quotations, might travel over one path, emergency notices over a higher priority set of nodes and Aunt Martha's email with a picture of her dog might go over a lesser hierarchy path.

Third parties might evaluate a packet before sending it along for error checking, redundancy, perhaps status from the receiving end that it had already been received—or similar activity.

In Practice, a probability can be assigned to the success of a given line or lines in a PDD.

This would be useful in defining multiple alternate points of rendezvous.

To further illustrate potential uses and features of the present technology, the following examples are provided.

Example 1

Figure 11:
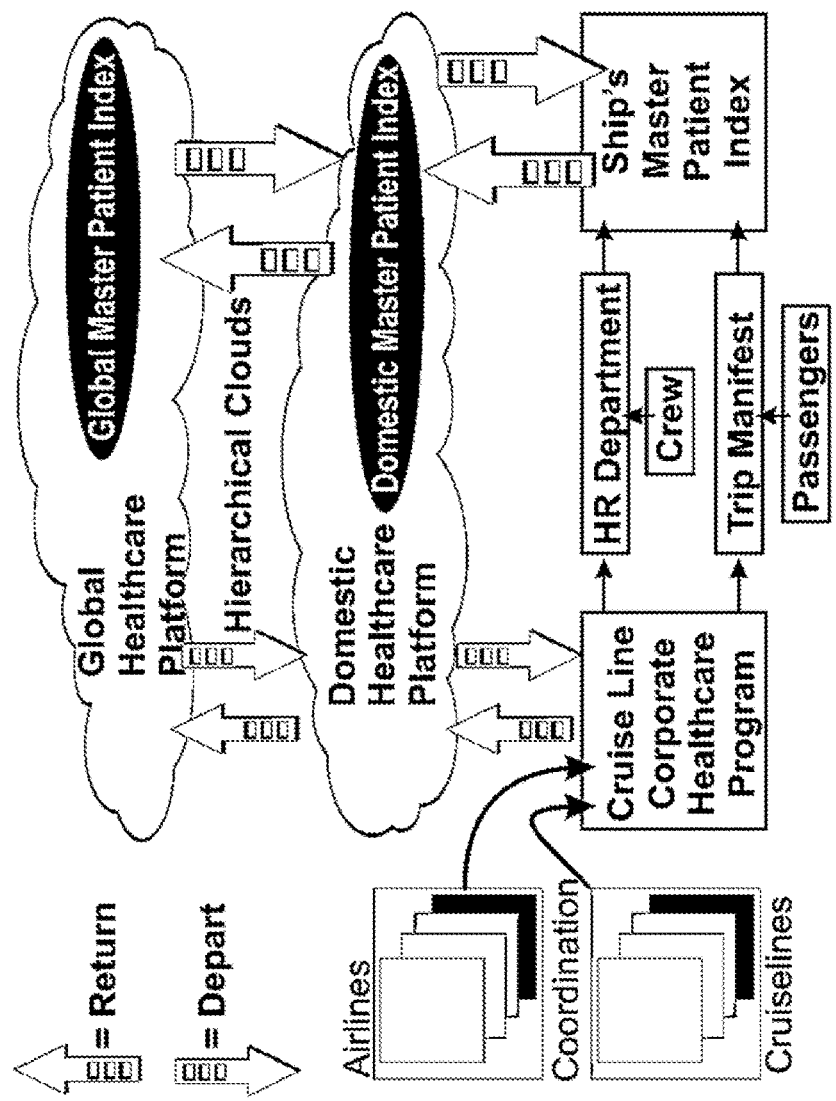
FIG. 11 schematically illustrates a hierarchical cloud structure in accordance with in the present technology.

Assume an important individual (Mr Potus) takes a vacation on a cruise ship and brings with him an entourage of 300. Mr. Potus's capability to make decisions must be constantly at hand and therefore both he and his entourage require that their health is a principle concern. Their health data is imported to a cloud oriented database on departure, maintained throughout the trip and restored with updates on return, as shown in FIG. 11. Any changes, or updates can be summoned from the global and domestic master databases on an as required basis. Coordinating airlines and other connecting cruise and transportation facilities pass health and other information at point of connection.

Figure 12:
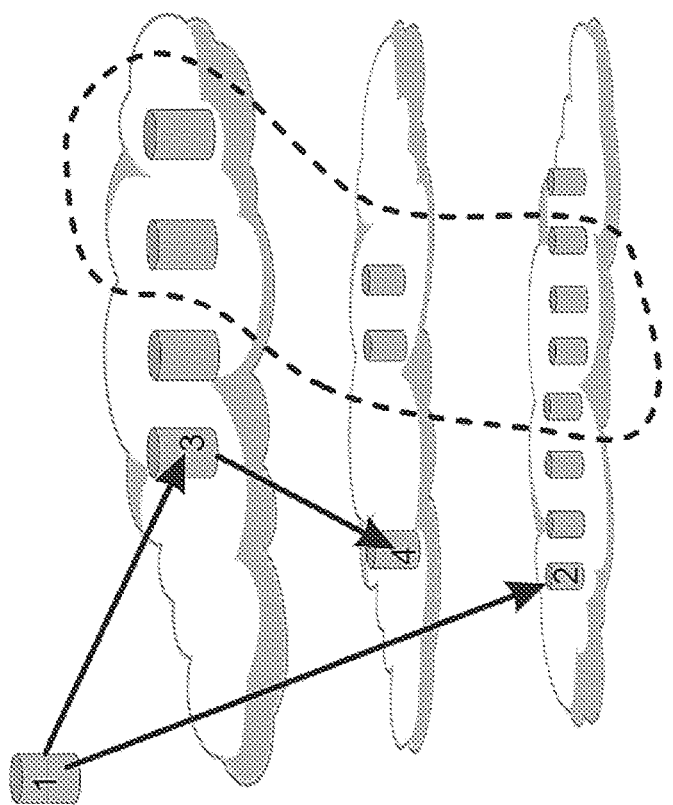
FIG. 12, illustrates operation of a hierarchical cloud structure in accordance with the present technology.

On departure, data collection, from a number of sources is assembled as a collective torrent, as shown in FIG. 12. The swarm (dotted lines) refeshes servers in multiple layers of the domestic and global clouds. Specifically, links to incomplete and developing files are associated to files within the cloud. Server 1 has a reserved position for lab (2,4) and dental (2) results that are not yet complete.

During the trip at sea, Mr Potus develops a severe pain in his lower jaw, which is an apparent infection deep in a recent dental crown. The ships dentist stabilizes the infection, noting that Mr. Potus's records warn of an alergy to morphine derivative pain killers—critical as MR. Potus must be continuously available for consultation and cannot become unconscious under anestesia.

A request is made for the pending lab results (2) that confirm the presence of an infection. These are small records, but the dental xrays are a very large record that is delivered withing seconds through the PPP means. Further the physible (3-d object) file is delivered from the dentist to an onboard 3D printer for manufacture of a replacement crown. In addition, the keys to MR Potus's armor plated limo had been left behind and a physible of the keys are rushed via the PPP mechanism also. In short order, with the pain gone and bite restored, Mr. Potus can join his entouage for the island barbeque. The critical advantage here is that a patient's medical records are never out of reach, that even large files can be delivered to any point on the planet in a cost effective manner.

Other Applications

The predictive path protocol concept can be made to connect any intermittently available device. Intermittent availability my be due to mobility, awake/versus standby modes, and out of contact situations, as with submarines, spacecraft, cellular users in subways, fire and police activities, emergency response and the like.

On the battlefield, mobile connectivity may be used to relay large files for maps, commands, visual-facial identification to individuals typically out of range, or out of line of sight for typical communication. I can be used for friend-foe identification, secure area access, border control and personnel identification using biometric matching to remote databases or inclusion in a group managed nationally (pre-approved travelers for example) or simply a citizen data base.

BitTorrent servers may be linked to a predicted path protocol destination—such that a torrent is received—say as a document or entertainment media, or physible—and it is then relayed over the predictive packet media to it's destination without breaking the pieces, or packet encryption and error detection. A bit-torrent data descriptor might be pushed to a remote node, and the network nodes then used either in a predictive path or chaotic bit-torrent fashion to retreive the file or message. Priority paths may also be defined for efficient utilization of the network when a bit-torrent file is cascaded in this fashion.

Software downloads, patches, repairs, upgrades may be distributed in this fashion. For example, a cellular provider has a very large update that will take considerable bandwidth over the cellular network, but can be passed without bandwidth impact over near field communication between phones in close proximity within specific crowds. For example, between college students where the class schedule is known. This is a form we might call promiscious predictive packet protocol.

Figure 13:
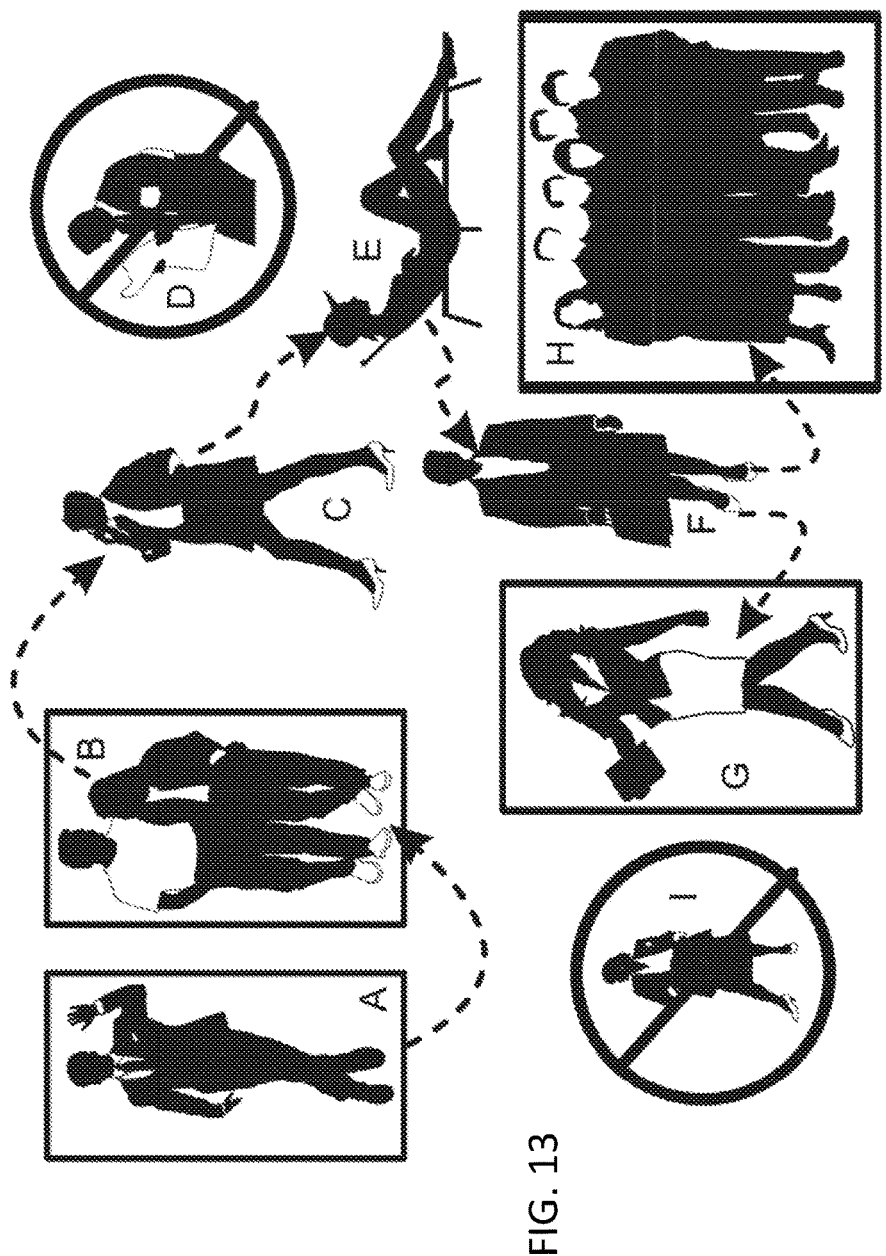
FIG. 13 illustrates an alternate embodiment of PPD's in accordance with the present technology.

Entertainment media might be distributed in this fashion as well. The above group of college students may "clandestinely" pass a file, performed, or otherwise obtained, by one student through the crowd of students through near field communications as they mill anonomously about a campus, without ever utilizing the cellular or wifi networks. Referring now to FIG. 13, an application to do this could be initially downloaded to the smartphones of all participants. One might call it "snaPPPster". Here, users D and I do not have the application. C,E,F aren't interested in the file, but pass it on and A,B, G, H enjoy it. This could establish common interest groups, for example, from a pool of strangers. Obviously, the application must be virus protected.

In some embodiments, the protocol may stop such transmissions if a copyright symbol, token or notice is defined in a packet. Smartphone applications might further inspect packets as a third party, for infringement. That is a $3^{rd}$ party might evaluate a packet or message for content before passing it along.

Indeed, class assignments, research, even homework and test results could be distributed within the group, with only those designated recipients having the correct ID or encryption codes to receive it—or be aware of the relay of packets through their intermittent connections. Messages could be passed almost clandestinely through a group, with detection, with reception and interpretation only by targeted individuals or members of a group. Also, uploads (or downloads) could be scheduled when it is known that members of a group will be in probable proximity. A long file is to be routed through several participants, where it is known that all or part of the group of paricipants will meet for lunch, prior to meeting the intended recipient.

Another potential use is providing targeted advertising can be directed to specific individuals, through specific points, nodes, and paths without "becons or broadcasting. For example a VIP frequent traveler might get a special deal, where other "ordinary" travelers are unaware of the advertized specials. Even if the messages are "snooped" only the last link in the communication may contain the destination.

Messages may be passed from participant to participant in apparent random fashion, where the intended recipient is the only one who knows that the message has reached it's destination. Of course the intended recipient may respond to acknowledge receipt in a similar way.

For cellular device communication—a repeater, or other mobile device, might serve as an intermediary to pass messages through multiple cellular devices that are out of range of the transmission tower, or shadowed, or in "black holes" where near-total cancellation of incident wave communications are cancelled by multipath echos. messages would be passed to mobile systems that would be known to be in the vicinity, or scheduled to be near the intended target molile communications device. Here the technical advantage is greater penetration of the covered area, fewer drop-outs, and more relaible communication in "fringe" areas.

Specifically, cellular communication might be extended over seas, where local towers do not exist, to provide both secure and emergency communications to remote (shipboard) mobile devices, where the mobile devices are tracked by satellite or radar and their paths predicted to intersect at predicted positions and times.

Similarly, messages may be passed between satellites, whose positions and timings are predictable and where a single satellite orbit does not connect to either orgin or destination of the message. This could be very valuable in low orbit satellites that have a lower probability of communication with a given origin or destination—without broadcastingg the messages.

Broadcasting of information can be avoided to minimize utilization of the media (either spectrum or space), where lower power is required in each node passing the messages as compared to a broadcast means that requires higher power in the broadcast transmitter—and greater sensitivity in the reception at the origin point for duplex communication. Broadcast also exposes the position of the origin. Obviously, in battlefied communications, obsuring the source and destination of a message can be critical.

Another technical advantage in predictive paths is that the destination of the message is only known to the last participant in the linkage of nodes for the communication. Similarly the origin can only be known to the first participant. Indeed, both origin and destination can be hidden. Obviously, in battlefied communications, obsuring the source and destination of a message can be critical.

The predicive participants in the protocol may be common members in a social network, whose schedules are known, because interaction between individuals withing a social network can be assumed to be more probable as compared to random strangers.

The means of communication most often used in the illustive examples is radio, but it might as well be modulation of light, sound, magnetics, or the like. Indeed, submarines might communicate via this protocol ustilizing underwater sound, potentially over long distances, between mobile systems who positions and timings are predictable (but secret) as required.

For social networking, PPP may be used to join groups, within crowds that can respond to an encrypted coded message passed through the crowd—for example, because they have the proper encryption key and recognise themselves as part of the group. Gps location, node id or the like. It could be used between trucks to track their travels—change route (enroute) for last minute pickup and discharge, used between (wifi connected) motorists to alert of upcoming traffic conditions. It may be used for commerce in retail identification and payment, to play games between individuals seperated beyond normal connectivity, or simply to find one's car by hopping between individuals and vehicles until the correct car is found and GPS location returned in a parking lot—or if stolen. Or indeed to find the cellphone itself or one's keys if they contain a transponding node.

In some implementaions, a Partial Personal Predictive Path Protocol is provided, where part of the message is transmitted randomly through the group, but other parts are predictive. For example in the college student example above the message is sent through people that will eventually be in the same classroom, where other (perhaps redundant) pieces travel through the crowd randomly, or clandestinely.

Technical Advantages. Like cellular systems, the protocol and methods of the present technology reduce the amount of bandwidth and co-channel interference between nodes for a given level of transmission power. However, unlike cellular systems, the origin and destination are not determinate and are not necessarily determinate to observing (snooping) parties. Rather, the complete message is only assembled for the last link in the path. Further, the origin message does not necessarily contain any information about the destination—or any information at all if it is defined as a dummy link on the path. Moreover, the timing of a response is not predictable. Also, the path can be modified on the fly by intermediary nodes along the path and potentially randomized, to scramble a path from one message to the next. Over time as multiple paths are tried, the system can learn the best paths, lengths, and nodes to use, when alternatives exist.

Figure 14:
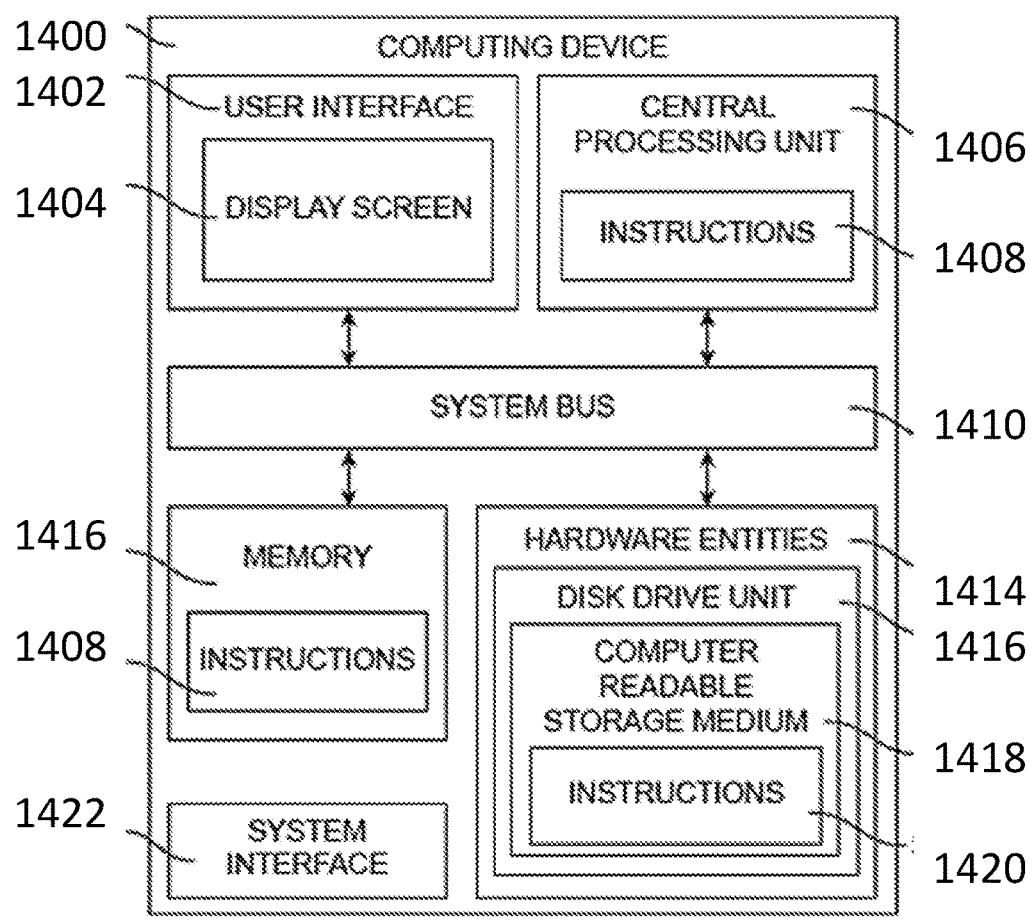
FIG. 14 shows an exemplary computing device for implementing the present technology.

Referring now to FIG. 14, there is provided a detailed block diagram of a computing device 1400 which can be implemented as control system 3260. Although various components are shown in FIG. 14, the computing device 1400 may include more or less components than those shown in FIG. 14. However, the components shown are sufficient to disclose an illustrative embodiment of the invention. The hardware architecture of FIG. 14 represents only one embodiment of a representative computing device for controlling a jointed mechanical device.

As shown in FIG. 14, computing device 1400 includes a system interface 1422, a Central Processing Unit (CPU) 1406, a system bus 1410, a memory 1416 connected to and accessible by other portions of computing device 1400 through system bus 1410, and hardware entities 1414 connected to system bus 1410. At least some of the hardware entities 1414 perform actions involving access to and use of memory 1416, which may be any type of volatile or non-volatile memory devices. Such memory can include, for example, magnetic, optical, or semiconductor based memory devices. However the various embodiments of the invention are not limited in this regard.

In some embodiments, computing system can include a user interface 1402. User interface 1402 can be an internal or external component of computing device 1400. User interface 1402 can include input devices, output devices, and software routines configured to allow a user to interact with and control software applications installed on the computing device 1400. Such input and output devices include, but are not limited to, a display screen 1404, a speaker (not shown), a keypad (not shown), a directional pad (not shown), a directional knob (not shown), and a microphone (not shown). As such, user interface 1402 can facilitate a user-software interaction for launching software development applications and other types of applications installed on the computing device 1400.

System interface 1422 allows the computing device 1400 to communicate directly or indirectly with the other devices, such as an external user interface or other computing devices. Additionally, computing device can include hardware entities 1414, such as microprocessors, application specific integrated circuits (ASICs), and other hardware. As shown in FIG. 14, the hardware entities 1414 can also include a removable memory unit 1416 comprising a computer-readable storage medium 1418 on which is stored one or more sets of instructions 1420 (e.g., software code) configured to implement one or more of the methodologies, procedures, or functions described herein. The instructions 1420 can also reside, completely or at least partially, within the memory 1416 and/or within the CPU 1406 during execution thereof by the computing device 1400. The memory 1416 and the CPU 1406 also can constitute machine-readable media.

While the computer-readable storage medium 1418 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to solid-state memories (such as a memory card or other package that houses one or more read-only (non-volatile) memories, random access memories, or other re-writable (volatile) memories), magneto-optical or optical medium (such as a disk or tape). Accordingly, the disclosure is considered to include any one or more of a computer-readable storage medium or a distribution medium, as listed herein and to include recognized equivalents and successor media, in which the software implementations herein are stored.

System interface 1422 can include a network interface unit configured to facilitate communications over a communications network with one or more external devices. Accordingly, a network interface unit can be provided for use with various communication protocols including the IP protocol. Network interface unit can include, but is not limited to, a transceiver, a transceiving device, and a network interface card (NIC).

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for data transmission via a network comprising a plurality of mobile nodes that connect transiently or intermittently, the method comprising:
   receiving information at a location for a message to be transmitted via the network;
   obtaining position information for the plurality of mobiles nodes as a function of time;
   determining a strategy for transmitting the message to a destination via the plurality of mobile nodes based on the position information and the location, the determining comprising:
   dividing the message into a plurality of message portions; and
   selecting a first path along the plurality of mobile nodes for each of the plurality of message portions; and
   transmitting the message via the plurality of mobile nodes based at least on the strategy and an actual availability of the plurality of mobile nodes.

2. The method of claim 1, further comprising:
   detecting that the position information fails to correspond to the actual availability;
   revising the strategy based on the actual availability to yield a revised strategy; and
   repeating the transmitting, using the revised strategy, for at least untransmitted ones of the plurality of message portions.

3. The method of claim 1, wherein the first path along the plurality of mobile nodes for each of the plurality of message portions is selected to balance a load across the plurality of nodes.

4. The method of claim 1, further comprising selecting at least one second path along the plurality of mobile nodes for each of the plurality of message portions, and wherein the transmitting comprises sending at least some of the of plurality of message portions along the first path and along the at least one second path.

5. A system for data transmission via a network comprising a plurality of mobile nodes that connect transiently or intermittently, the system comprising:
a processor; and
a computer-readable medium, having stored thereon a plurality of instructions for causing the processor to perform the method comprising:
receiving information at a location for a message to be transmitted via the network;
obtaining position information for the plurality of mobiles nodes as a function of time;
determining a strategy for transmitting the message to a destination via the plurality of mobile nodes based on the position information and the location, the determining comprising:
dividing the message into a plurality of message portions; and
selecting a first path along the plurality of mobile nodes for each of the plurality of message portions; and
transmitting the message via the plurality of mobile nodes based at least on the strategy and an actual availability of the plurality of mobile nodes.

6. The system of claim 5, further comprising instructions for causing the processor to perform steps comprising:
detecting that the position information fails to correspond to the actual availability;
revising the strategy based on the actual availability to yield a revised strategy; and
repeating the transmitting, using the revised strategy, for at least untransmitted ones of the plurality of message portions.

7. The system of claim 5, wherein the first path along the plurality of mobile nodes for each of the plurality of message portions is selected to balance a load across the plurality of nodes.

8. The system of claim 5, further comprising instructions for causing the processor to select at least one second path along the plurality of mobile nodes for each of the plurality of message portions, and wherein the transmitting comprises sending at least some of the of plurality of message portions along the first path and along the at least one second path.

9. A non-transitory computer-readable medium having stored thereon a computer program executable on a computer, the computer program comprising a plurality of instructions comprising:
receiving information at a location to be transmitted via a network comprising a plurality mobile nodes;
obtaining position information for the plurality of mobiles nodes as a function of time;
determining a strategy for transmitting the message to a destination via the plurality of mobile nodes based on the position information and the location, the determining comprising:
dividing the message into a plurality of message portions; and
selecting a first path along the plurality of mobile nodes for each of the plurality of message portions; and
transmitting the message via the plurality of mobile nodes based at least on the strategy and an actual availability of the plurality of mobile nodes.

10. The non-transitory computer-readable medium of claim 9, further comprising instructions for:
detecting that the position information fails to correspond to the actual availability;
revising the strategy based on the actual availability to yield a revised strategy; and
repeating the transmitting, using the revised strategy, for at least untransmitted ones of the plurality of message portions.

11. The non-transitory computer-readable medium of claim 9, wherein the first path along the plurality of mobile nodes for each of the plurality of message portions is selected to balance a load across the plurality of nodes.

12. The non-transitory computer-readable medium of claim 9, further comprising selecting at least one second path along the plurality of mobile nodes for each of the plurality of message portions, and wherein the transmitting comprises sending at least some of the of plurality of message portions along the first path and along the at least one second path.

* * * * *